Figure 1:
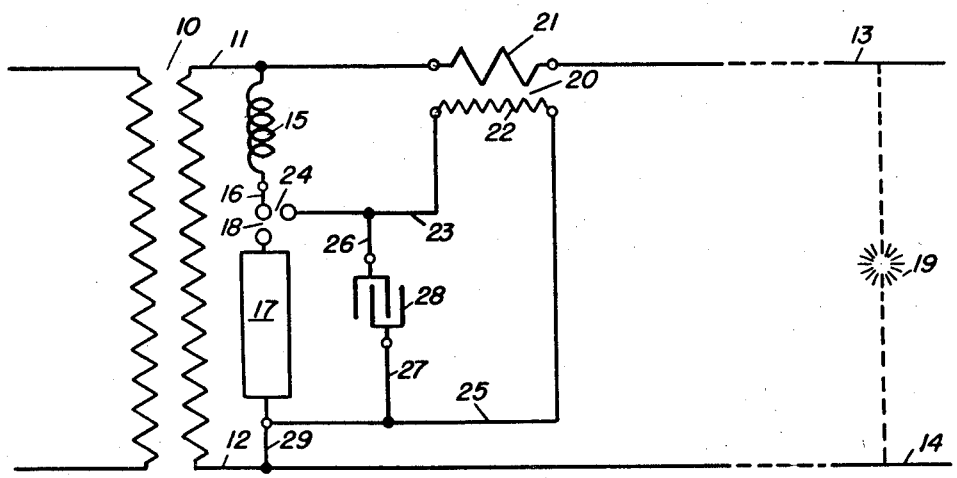

June 28, 1949. E. H. YONKERS, JR., ET AL 2,474,711
PROTECTIVE SYSTEM FOR ELECTRIC LINES
Filed Nov. 11, 1943 2 Sheets-Sheet 1

INVENTORS
Edward H. Yonkers Jr.
Ralph R. Pittman

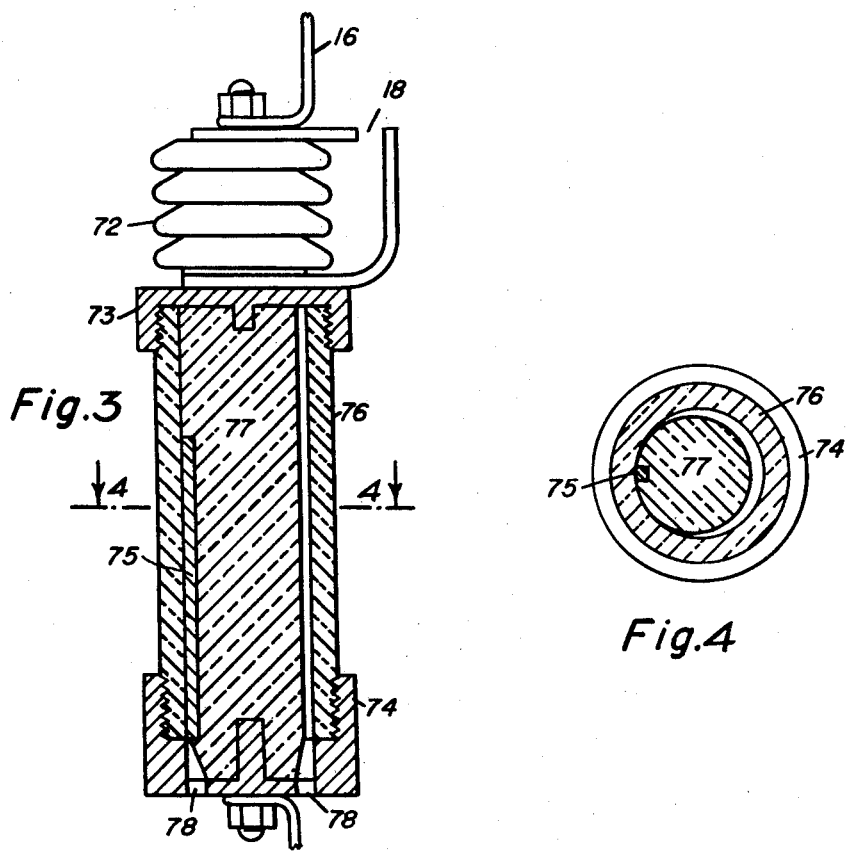

Patented June 28, 1949

2,474,711

UNITED STATES PATENT OFFICE 2,474,711

PROTECTIVE SYSTEM FOR ELECTRIC LINES

Edward H. Yonkers, Jr., Chicago, Ill., and Ralph R. Pittman, Pine Bluff, Ark.

Application November 11, 1943, Serial No. 509,934

5 Claims. (Cl. 175—294)

This invention relates to systems for the protection of electric transmission and distribution circuits, and is particularly directed to the protection of a connected line from the adverse effects of arcing faults.

Overhead transmission lines and distribution circuits are subject to arcing faults caused principally by flash-overs resulting from lightning discharges, and to a lesser degree by switching surges and contact of swinging conductors. It is well known that arcing faults, if not quickly extinguished, may not only cause serious damage to the structural parts of the affected line because of the intense heat of the arc, but may also impose such a load on the affected line that instability occurs which may result in a complete interruption of a large power system. It is also well known that the adverse effect of an arcing fault depends directly upon its duration; further, it has been recognized that all arcing faults are caused by practically instantaneously disappearing events.

Heretofore several arrangements have been presented to accomplish the extinguishment of arcing faults in the least possible time. The arrangement employing a zero phase sequence inductance in the neutral to ground connection, the dimensions of such an inductance being such as to neutralize, upon the occurrence of an arcing ground fault, the capacitance of the ungrounded conductors, is one previously hereto tried method. This arrangement requires a different magnitude of inductance when any switching is done which in effect increases or decreases the length of the line, and this consideration, together with the long time of the order of one second to effect arc extinguishment, has prevented general adoption of this method. Further details of this method may be found in U. S. Patent 1,537,371, dated May 12, 1925, and issued to Waldemar Peterson.

Another method, and that finding wide application at this time, is that of interrupting the current in the affected circuit for a short time by means of high speed opening and reclosing circuit breakers. This method has been effective in reducing the outage time to users supplied from the affected line, but the time required for the opening and reclosing cycle is too great to prevent synchronous equipment becoming unstable or to avoid serious damage from the thermal effects of arcing faults. A third arrangement is that in which the line is quickly shunted by mechanical means through a relatively low impedance. This system further reduces thermal damage to conductors on relatively low voltage circuits, but requires that the shunting impedance be quickly removed and the circuit opened and reclosed; these operations requiring an interval too long to be a satisfactory solution of the problem. Both of the latter systems impose heavy duty on the station circuit breakers, making necessary frequent inspections and maintenance work.

An object of the present invention is to provide an arrangement for the extinguishment of arcing faults on an electric line in an interval of about 0.0085 second, or the duration of ½ cycle of a 60 cycle alternating current system.

Another object is to provide a system for ultra high speed extinguishment of arcing faults without the use of expensive, high interrupting capacity switching equipment.

A further object is the provision of means for extinguishing arcing faults which may occur at any point along a line by diverting at a predetermined point the current from the affected conductor, so that the arcing fault is extinguished by so reducing the current through the arc path that the voltage available is less than that required to maintain the arc.

A further object is to provide an arrangement for extinguishing arcing faults on a circuit without disconnecting the circuit from its source of power.

An additional object is to provide a system having means dependent upon the abnormal electrical conditions caused by the arcing fault for extinguishing the arc and automatically restoring the system to normal condition immediately following arc extinguishment.

In the practical application of our invention, we employ means responsive to the occurrence of an arcing fault for causing sparkover of a path electrically in shunt with the arcing fault and between the power source and the arcing fault, together with means for quickly extinguishing the arc following the sparkover, thereby clearing the affected line without the use of moving parts, if desired. Otherwise stated, our system operates through the substantially instantaneous diversion of the arc current from the arcing fault through a predetermined path within an arc extinguishing device, so that in sequence the arcing fault is extinguished as the initiated arc is formed, and the latter arc quickly extinguished, all of these events requiring a time of ½ cycle on a 60 cycle system. This short time is made possible by the elimination of moving parts currently employed in fault current interrupting devices.

Additional objects and advantages will appear from the following description and drawing setting forth in detail certain embodiments or modifications of our invention, and the scope of the invention will be pointed out in the appended claims.

Figure 2:
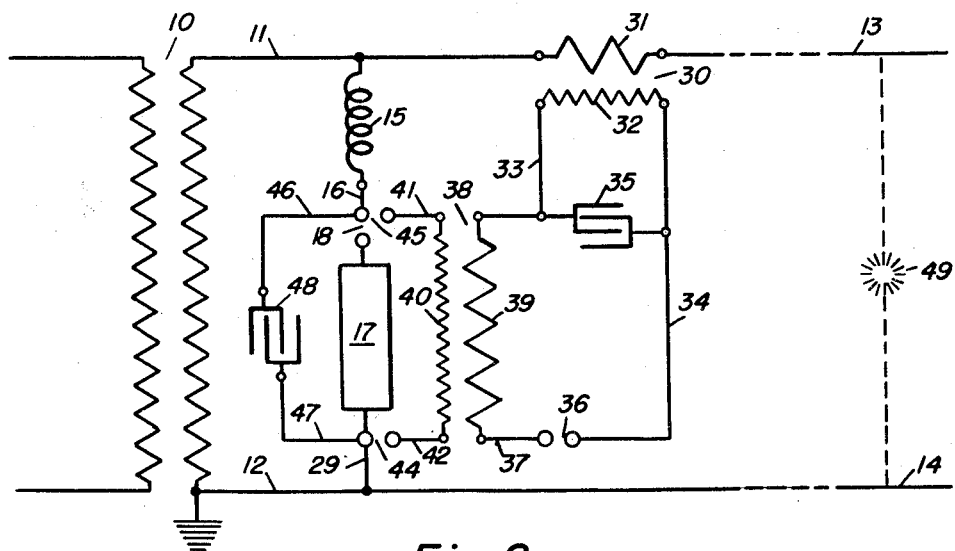

In the drawing: Fig. 1 is a diagrammatic representation of an embodiment of the invention, applied to a single phase alternating current electric line; Fig. 2 is another diagrammatic representation of the invention, also applied to a single phase alternating current line; and Figs. 3 and 4 illustrate a preferred type of voltage limiting and arc extinguishing device which may be embodied in the invention, Fig. 3 being shown as an elevational view, partly in section, and Fig. 4 a view taken along the line 4—4 of Fig. 3.

Similar reference characters identify corresponding parts in the several figures of the drawing.

Referring first to Fig. 1, power supply conductors 11 and 12 of a single phase alternating current line are connected to a source transformer 10. Only a single phase circuit is here illustrated, but it will be understood that our invention can be similarly applied to each phase of a polyphase system. It will also be apparent that our system may be applied to a line having one grounded conductor, in which event the system operates to extinguish arcing faults to any grounded conducting object.

For connecting the load or line conductors 13 and 14 to the supply conductors 11 and 12, a current-responsive inductive device 20 is arranged with its primary winding 21 in series with the conductors 11 and 13, so that the voltage appearing across the primary winding 21 is translated to a relatively higher voltage induced in the secondary winding 22. The voltage derived from the current-responsive voltage-producing inductive device 20 which is induced in the secondary winding 22 is a predetermined function of the current in the conductor 13.

At a point on the supply side of the inductive device 20, the supply conductors 11 and 12 are bridged serially through the frequency responsive choke 15, the conductor 16, the voltage limiting and arc extinguishing device 17 which includes the series spark gap 18, and the conductor 29.

The voltage responsive arc suppressing device 17 preferred for use in our construction is shown more in detail in Figs. 3 and 4, and described in greater detail in U. S. Patent No. 2,164,720, dated July 4, 1939, and issued to Ralph R. Pittman. It will be apparent that other voltage responsive arc interrupter constructions known to the art may be used.

As shown in Figs. 3 and 4, the spark gap 18 bridges the insulator 72, and is serially related to the arc extinguishing structure immediately below. The latter includes the outer tubular insulator 76, provided at its respective ends with the electrodes 73 and 74, and containing the eccentrically disposed filler 77. The lower electrode 74 is provided with the upwardly extending extension 75, the arrangement being such that the weakest sparkover path through the device is along the line of abutment of the filler 77 with the inner surface of the tubular insulator 76, and between the upper end of the electrode extension 75 and the upper electrode 73. Following sparkover of the weakest path, any arc ensuing is driven around the filler 77, being concurrently moved laterally and elongated, and so cooled to facilitate extinguishment. The openings 78 through the lower electrode vent the gaseous products attending the arc, and the device is most economically constructed when the tubular insulator 76 and the filler 77 are constructed from arc-responsive gas-evolving material.

Referring again to Fig. 1, the arc interrupter 17 is so constructed and arranged that no discharge takes place therethrough when the voltage between both the supply conductors 11 and 12, and the conductors 23 and 25 is normal. Sparkover occurs and current passes through the interrupter 17 to shunt the supply conductors 11 and 12 only when a predetermined voltage is applied from the high voltage winding 22. For applying the predetermined voltage to the arc interrupter 17, the conductors 23 and 25 are connected to its respective terminals, a spark gap 24 being interposed, and a condenser 28 bridged across the high voltage winding 22 of the inductive device 20, through the conductors 26 and 27.

We will now describe with respect to Fig. 1 the operation of the system upon the occurrence of an imaginary arcing fault between the conductors 13 and 14, as indicated at 19, the imaginary arcing fault being such as might be caused by lightning on exposed overhead conductors. As previously mentioned, under normal conditions the withstand voltage of the shunting circuit including the arc interrupter 17 is greater than either the normal line voltage or the normal derived voltage induced in the high tension winding 22 of the inductive device 20.

Immediately upon the occurrence of the arcing fault indicated at 19, the current increases through the primary winding 21 of the inductive device 20, and the voltage induced in the secondary winding 22 immediately increases. Potential builds up across the condenser 28 until the predetermined voltage required to cause sparkover of the gap 24 and the arc interrupter 17 is attained, when an oscillatory discharge occurs through the arc interrupter 17, thereby shunting the supply conductors 11 and 12 through the arc so initiated. The impedance or choke device 15 is such that its impedance to the oscillatory discharge current of the condenser 28 is very great relative to its impedance to the normal operating frequency current of the power supply, so that substantially open circuit is presented to the high frequency condenser discharge, while at the same time the impedance of the choke 15 is relatively very low to normal frequency current, which is commonly 60 cycles per second.

The supply voltage is quickly depressed to a small magnitude relative to the normal circuit voltage by the shunt circuit so initiated through the arc interrupter 17, and the arc of the arcing fault is extinguished from lack of voltage to maintain it, usually at the first current zero. Following extinguishment of the arcing fault 19, the initiating voltage drops to normal, the arc initiated over the predetermined path is extinguished within the arc interrupter 17, and conditions are restored to normal.

It may be mentioned that all of the above described events occur rapidly, the entire sequence requiring only about ½ cycle of a 60 cycle system. An examination of the invention will show that the derived voltage will anticipate to some extent the decremental arc voltage at the fault, because of the presence of the condenser 28; also that the increasing current attending the building up of the arc following sparkover tends to increase the derived voltage and thereby assure quick and positive operation.

From the foregoing, it will be apparent that arcing faults may be quickly extinguished through the use of our invention without moving parts and without disconnection of the faulty circuit from the power source.

In Fig. 2 is shown a modification of the arrangement described above, which requires somewhat less volt-amperes input for deriving the required sparkover voltage, and which is somewhat better adapted for systems operating at a higher voltage than those for which the arrangement shown in Fig. 1 is most suitable.

Referring in detail to Fig. 2, the source transformer 10, the supply conductors 11 and 12, the extended line or load conductors 13 and 14, and the arrangement, purpose and operation of the elements constituting the path bridging the supply conductors 11 and 12 are the same as described in connection with Fig. 1. The principal change resides in the current-responsive voltage-deriving arrangement.

An inductive device 30, having its primary winding 31 serially connected between the supply and line conductors, is provided with a secondary winding 32. The condenser 35 is connected to shunt the secondary winding 32, and the primary winding 39 of an oscillation transformer 38 is connected to the secondary winding 32 through the conductors 33 and 34, the spark gap 36, and the conductor 37. The secondary winding 40 of the oscillation transformer 38 is connected through the conductors 41 and 42, and the spark gaps 44 and 45, to impress a predetermined voltage appearing thereacross on the arc interrupter 17. A condenser 48 is connected in parallel with the arc interrupter 17 by means of the conductors 46 and 47.

Under the condition of normal current through the primary winding 31 of the inductive device 30, the voltage appearing across the secondary winding 32 is insufficient to cause sparkover of the gap 36, and the arc interrupter 17 is constructed to withstand without sparkover the normal voltage between the conductors 11 and 12.

Assuming an arcing fault as indicated at 49 occurs, current increases through the winding 31 to a predetermined magnitude such that the derived voltage appearing across the gap 36 causes it to sparkover as an oscillatory discharge. The attending current oscillations pass through the primary 39 of the high frequency transformer 38, building up a voltage across the secondary winding 40 which breaks down the gaps 44 and 45, thus initiating an arc through the arc interrupter 17 as the condenser 48 discharges. The discharge of the condenser 48 effects an increase of the current through the arc interrupter 17 in discharging its stored energy, and assists in lowering the resistance of the shunting path between the supply conductors 11 and 12.

As described heretofore, the voltage tending to maintain the arcing fault is depressed to a point such that the arc is extinguished, the current through the winding 31 returns to normal, and the arc discharge caused by the derived voltage ceases, or otherwise stated, the system returns to normal immediately following extinguishment of the shunting arc within the arc interrupter 17.

Numerous modifications of our invention will readily appear to those skilled in the art from the arrangements described herein. It is therefore our intention to illustrate and describe our invention herein as exemplifying in its broadest aspects an arrangement for extinguishing an arcing fault by means of a construction in which the abnormal circuit conditions incident to the occurrence of the arcing fault quickly cause shunt-circuiting of the supply circuit through another sparkover-initiated arc along a predetermined path to thereby extinguish the arcing fault, and subsequently extinguishing the initiated arc forming a part of the shunt-circuiting path.

Therefore it is intended that our drawing and the description thereof will be regarded as illustrative, rather than limiting.

We claim, as our invention:

1. A system for protecting an electric line from the effects of arcing faults occurring between the conductors thereof which normally differ in potential when connected to a source of electric power, comprising in combination, elements constituting a voltage limiting and arc extinguishing device positioned between the section of line to be protected from the effects of arcing faults and the source of power, said voltage limiting and arc extinguishing device being constructed and arranged with respect to said conductors to provide a preferential sparkover path therebetween and being adapted to sparkover and carry current when a predetermined voltage is applied between said conductors, transformer means having a primary winding and a secondary winding means continuously connecting said primary winding in series with one of said conductors, a condenser connected in shunt with said secondary winding of said transformer means, and spark-gap means normally insulating said transformer and condenser from said voltage limiting and arc extinguishing device, said electrodes being so arranged with respect to said voltage limiting and arc extinguishing device as to sparkover and apply said predetermined voltage to said device concurrently with the time that the current in said one of said conductors exceeds a predetermined magnitude.

2. A construction for extinguishing an abnormal alternating current arc which occurs between the spaced conductors of a line, comprising in combination, voltage-deriving means responsive to the passage of a predetermined abnormal current through one of said conductors for deriving therefrom a voltage which is substantially a predetermined function of the magnitude of said current, said means including conducting means continuously in series with said one of said conductors, spaced conducting elements forming a predetermined arc path between said conductors, said elements constituting a dielectric structure positioned on the source side of said voltage-deriving means and adapted to sparkover when a predetermined voltage occurs between said conductors, and means including a spark-gap for applying the derived voltage to said dielectric structure at the same time that the current through said one of said conductors exceeds a predetermined magnitude, said last-named means including frequency-responsive impedance means connected between said dielectric structure and said one of said conductors.

3. In combination, a circuit including a pair of conductors extending from a normal frequency alternating current source to a load, a choke coil having relatively high impedance to current of higher than normal frequency, an arc interrupter including serially connected spark-gaps adapted to sparkover at a predetermined voltage, current-responsive voltage-deriving means connected in series with said circuit and adapted to derive a voltage at least as great as said predetermined voltage from said circuit when the current in said circuit attains a predetermined magnitude, electrical connections connecting said choke coil and said arc interrupter in series circuit relation between said conductors on the source side of said voltage-deriving means for establishing a shunting path across said circuit effective to reduce the current in said voltage-deriving means below said predetermined magnitude when said arc interrupter sparks over, and spark-gap means interposed between said arc interrupter and said voltage-deriving means arranged to sparkover in series relation with said arc interrupter to cause said reduction of current in said voltage-deriving means.

4. In combination, a circuit including a pair of conductors extending from a normal frequency alternating current source to a load, a transformer having a primary winding in series with one of said conductors and a secondary winding, a condenser bridging said secondary winding, a spark gap and a voltage-responsive arc interrupter connected in series circuit relation with said secondary winding, an electrical connection from one terminal of said arc interrupter to the other of said conductors, a choke coil having relatively high impedance to current of higher than normal frequency, an electrical connection from one terminal of said choke coil to said one of said conductors at a point on the source side of said primary winding, and an electrical connection from the other terminal of said choke coil to the other terminal of said arc interrupter.

5. In combination, a circuit including a pair of conductors extending from a normal frequency alternating current source to a load, a first transformer having a primary winding in series with one of said conductors and a secondary winding, an oscillation transformer having a primary winding and a secondary winding, a spark gap connected in series circuit relation with the secondary winding of said first transformer and the primary winding of said oscillation transformer, a condenser bridging the secondary winding of said first transformer, a voltage-limiting arc interrupter comprising a dielectric structure adapted to sparkover and carry current when a predetermined voltage is impressed on the respective terminals thereof, spark gaps normally isolating the terminals of said arc interrupter from the respective terminals of the secondary winding of said oscillation transformer and adapted to sparkover and impress said pretermined voltage on said arc interrupter when the current in the primary winding of said first transformer exceeds a predetermined magnitude, a choke coil having relatively high impedance to current of higher than normal frequency, a connection from one terminal of said choke coil to said one of said conductors at a point on the source side of the primary winding of said first transformer, a connection from the other terminal of said choke coil to one terminal of said arc interrupter, a connection from the other terminal of said arc interrupter to the other of said conductors, and a condenser connected in shunt circuit relation with said arc interrupter.

EDWARD H. YONKERS, Jr.
RALPH R. PITTMAN.

REFERENCES CITED

The following references are of record in the file of this patent:

UNITED STATES PATENTS

| Number | Name | Date |
|---|---|---|
| 454,671 | Thomson | June 23, 1891 |
| 495,853 | Thomson | Apr. 18, 1893 |
| 1,201,610 | Nicholson | Oct. 17, 1916 |
| 1,230,681 | Creighton | June 19, 1917 |
| 2,143,992 | Maurer et al. | Jan. 17, 1939 |
| 2,157,925 | Stoddard | May 9, 1939 |
| 2,162,488 | Marbury | June 13, 1939 |
| 2,164,720 | Pittman | July 4, 1939 |
| 2,246,180 | McMorris | June 17, 1941 |
| 2,288,953 | Matthews | July 7, 1942 |
| 2,290,254 | Slepian | July 21, 1942 |
| 2,363,898 | Partington | Nov. 28, 1944 |

FOREIGN PATENTS

| Number | Country | Date |
|---|---|---|
| 463,423 | Germany | July 27, 1928 |
| 567,079 | Germany | Jan. 3, 1933 |